United States Patent
Sabeti (10) Patent No.: US 9,897,152 B2
(45) Date of Patent: Feb. 20, 2018

(54) WEAR OPTIMIZED PAD DESIGN

(71) Applicant: Bendix Spicer Foundation Brake LLC, Elyria, OH (US)

(72) Inventor: Manouchehr Sabeti, North Olmstead, OH (US)

(73) Assignee: Bendix Spicer Foundation Brake LLC, Elyria, OH (US)

(*) Notice: Subject to any disclaimer, the term of this patent is extended or adjusted under 35 U.S.C. 154(b) by 0 days.

(21) Appl. No.: 15/423,953

(22) Filed: Feb. 3, 2017

(65) Prior Publication Data

US 2017/0146081 A1 May 25, 2017

Related U.S. Application Data

(63) Continuation of application No. 14/844,813, filed on Sep. 3, 2015, now Pat. No. 9,605,721.

(51) Int. Cl.
| | |
|---|---|
| *F16D 65/092* | (2006.01) |
| *F16D 55/225* | (2006.01) |
| *F16D 55/22* | (2006.01) |
| *F16D 69/00* | (2006.01) |
| *B60T 1/06* | (2006.01) |
| *F16D 65/095* | (2006.01) |

(52) U.S. Cl.
CPC ............ *F16D 65/092* (2013.01); *B60T 1/065* (2013.01); *F16D 55/22* (2013.01); *F16D 65/095* (2013.01); *F16D 69/00* (2013.01)

(58) Field of Classification Search
CPC ...... F16D 55/32; F16D 55/225; F16D 55/226; F16D 65/0018; F16D 65/092; F16D 65/0972

USPC ............... 188/73.31, 250 B, 250 D, 250 G
See application file for complete search history.

(56) References Cited

U.S. PATENT DOCUMENTS

| | | | |
|---|---|---|---|
| 2,926,757 A | 3/1960 | Armstrong | |
| 3,990,545 A * | 11/1976 | Hoffmann | F16D 55/226 188/72.4 |
| 4,394,891 A | 7/1983 | Oshima | |
| 5,284,227 A * | 2/1994 | Pelfrey | B62L 1/005 188/250 B |
| 6,119,828 A | 9/2000 | Parsons | |
| 6,386,335 B1 | 5/2002 | DiPonio | |

(Continued)

OTHER PUBLICATIONS

FMSI Brake Lining Databook, Friction Materials Standards Institute, Inc., 2000 (Fourteen (14) pages).

(Continued)

*Primary Examiner* — Christopher P Schwartz
(74) *Attorney, Agent, or Firm* — Crowell & Moring (57) ABSTRACT

A brake pad for a disc brake with decreased wear characteristics is provided. The brake pad is configured with the distribution of brake pad friction material weighted toward the radially outer region of the brake pad, with the lateral sides of the pad material being generally aligned with radial lines originating at the rotation axis of the brake disc of the disc brake. The brake pad friction material distribution results in decreased brake application pressure between the brake pad and the brake disc while obtaining the same braking force provided by a comparable generally rectangular brake pad, resulting in lower brake pad wear at the same braking force levels.

4 Claims, 5 Drawing Sheets

(56) References Cited

U.S. PATENT DOCUMENTS

| | | | | |
|---|---|---|---|---|
| 7,578,374 B2* | 8/2009 | Takeo | ............... | F16D 55/226 |
| | | | | 188/73.31 |
| 7,731,002 B2* | 6/2010 | Haupt | ............... | F16D 65/095 |
| | | | | 188/73.43 |
| 8,505,699 B2 | 8/2013 | Kappagantu et al. | | |
| 9,605,721 B1* | 3/2017 | Sabeti | ............... | F16D 55/225 |
| 2011/0073418 A1 | 3/2011 | Kim | | |
| 2011/0259686 A1 | 10/2011 | Hattori et al. | | |
| 2011/0290599 A1 | 12/2011 | Vasel | | |
| 2013/0133990 A1 | 5/2013 | Suzuki et al. | | |

OTHER PUBLICATIONS

International Search Report (PCT/ISA/220 & PCT/ISA/210) issued in PCT Application No. PCT/US16/49872, including Written Opinion (PCT/ISA/237) dated Oct. 4, 2016 (Seven (7) pages).

* cited by examiner

WEAR OPTIMIZED PAD DESIGN

This application is a continuation of application Ser. No. 14/844,813, now U.S. Pat. No. 9,605,721, the disclosure of which is incorporated herein in its entirety.

BACKGROUND AND SUMMARY OF THE INVENTION

The present invention relates to disc brakes for vehicles, and in particular to brake pads in disc brakes, such as air-operated disc brakes utilized on commercial vehicles.

Figure 1:
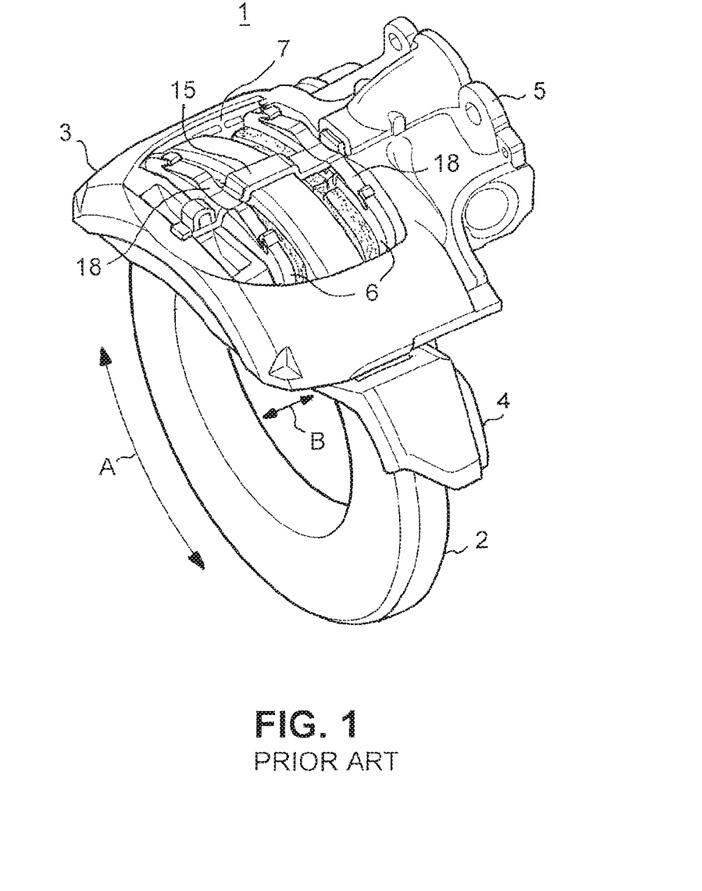
FIG. 1 is an oblique view of a disc brake.

An example of a commercial vehicle air-operated disc brake is shown in FIG. 1. In the FIG. 1 embodiment the disc brake 1 includes a brake disk 2 which rotates in direction A about its rotation axis B. A brake caliper 3 straddling the brake disk 2 is affixed to a carrier mount 4 which in turn is fixed to a vehicle axle, typically via a torque plate or a brake spider (not illustrated). In this embodiment the carrier mount 4 receives and supports both the caliper 3 and the brake pads 6. The caliper 3 is actuated in this embodiment by a pneumatic actuator (not illustrated) mounted at the actuator mounting face 5 of the caliper. The actuator acts upon a brake pad application mechanism contained within caliper 3 to press the brake pads 6 against the brake disk 2 to slow the vehicle. The present invention is not restricted to a particular type of brake actuator, for example, a pneumatic actuator or an electrically-driven actuator may be used. Nor is the invention limited to a particular type of brake caliper mount arrangement. For example, the brake caliper may be mounted in a fixed manner on a carrier or may be a sliding caliper.

Figure 4:
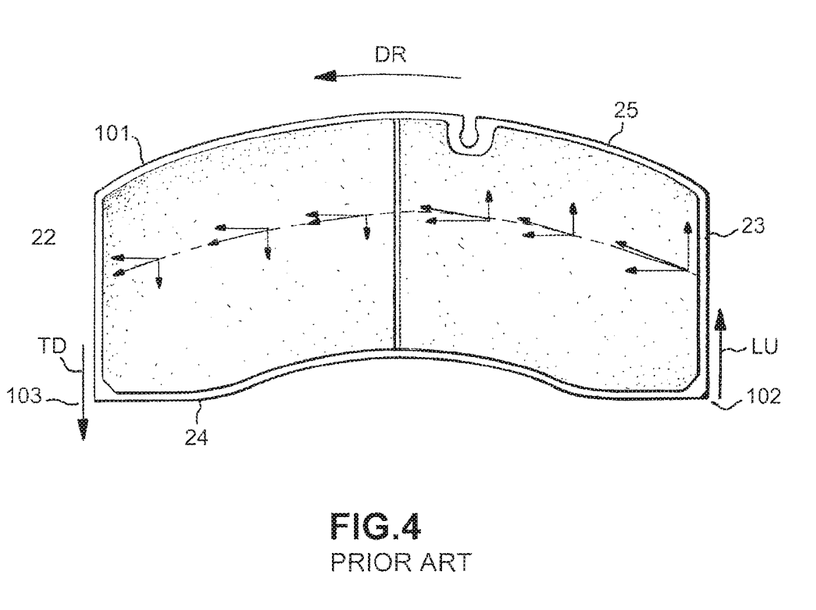
FIG. 4 is an elevation view of a known generally rectangular brake pad, annotated to illustrate pad motion in response to brake application.

In disc brake applications such as commercial vehicle disc brakes the brake pads typically have had a generally rectangular shape, in part due to the limitations on the size and configuration of the disc brake components (the disc brake having to exist within a highly-space constrained envelope provided by wheel rims), and in part due to cost and structural limitations discussed further below. An example of such a previous brake pad is shown in FIG. 4.

A common feature of a previous brake pad 20 is their having essentially parallel lateral sides 22, 23, i.e., the brake pad sides facing in the circumferential direction of the brake disc toward adjacent brake pad abutment surfaces are parallel to one another. The generally rectangular shape may include radially inner and radially outer sides of the brake pad 24, 25 that are slightly curved to generally follow the curvature of the brake disc as shown in FIG. 4, or in the case of the radially outer side, follow the shape of an adjacent outer region of the brake caliper (not illustrated). The use of parallel lateral sides of the brake pad has in part been the de facto standard in commercial vehicle disc brakes in part due to practical manufacturing considerations (for example, less costly machining of brake pad abutment surfaces and parallel-sided brake pad backing plates) and in part due to structural reasons to ensure adequate brake pad abutment strength, wear, and braking force absorption performance.

With their generally rectangular shape, the previous commercial vehicle disc brake pads have presented to the brake disc essentially constant width and height profiles from one lateral side of the brake pad to the other. Such brake pad shapes have several disadvantages during brake operation. Among these is the fact that the specific braking energy transfer from the brake disc to the brake pad is not constant across the radial height of the brake pad. Instead, the energy transfer varies as a function of radial height relative to the rotation axis of the brake disc (i.e., braking torque varying as a function of the distance from the brake disc rotation axis, where force×distance=torque), and as a function of the length of the friction surface of the brake pad friction material at different radial heights. As a result, the energy transfer to the brake pad, and the resulting localized wear of the brake pad, is inconsistent across the face of the brake pad friction material. This can lead to premature wear of the friction material in some areas of the brake pad and thereby shorten the time before the brake pad must be replaced.

The present invention addresses this and other problems by providing a brake pad with more efficient and even braking energy transfer distribution across the face of the brake pad lining material. The approach of the present invention provides for more even pad lining material wear, thereby extending service life of the brake pad. The improved brake pad performance also enables reduction in overall brake size by allowing the use of smaller brake pads while still providing satisfactory braking performance.

In an embodiment of the present invention, the brake pad lining material, and preferably the brake pad backing plate carrying the lining material, has a generally arc-shaped profile, with the radially outer portion of the lining material having a width in the circumferential direction that is longer than the width of the lining material at the radially inner portion of the brake pad. Preferably, the width of the brake pad lining material as a function of radial distance from the brake disc rotation axis is established by generally aligning the lateral sides of the lining material along radial lines that intersect at or near the rotation axis of the brake disc. The lateral sides of the brake pad need not be exactly aligned with the radial lines from the rotation axis; rather the present invention contemplates the greatest lining material width at the radially outer region of the brake pad, while the width is smaller at the radially inner region of the lining material. The closer the intersection is to the center of the brake disc rotor, the more efficient the energy distribution at the pad-disc interface.

Another further advantage of the present invention is that the reduced width in the radially inner region of the brake pad permits the abutment faces of the brake pad carrier and the lateral sides of the brake pad to meet along a line that is more nearly perpendicular to a radius from the rotation axis. This arrangement allows the transfer braking forces between the lateral side of the brake pad and pad abutment surface of the pad carrier at or nearly normal to the abutment line. This provides for more uniform distribution of the abutment forces over the abutment surface, i.e., more even (and thus lower) contact pressures, helping minimize brake pad vibrations and associated brake noise, improved fatigue life performance and reduce component wear.

In addition, the arrangements can help in reducing the effects of "pad kick," an in-place rotation of the brake pad that can generate undesired brake application noise due to pad vibrations, increase fatigue damage to typical brake pad retaining hardware (e.g., over-pad leaf springs) and increase wear and damage to the brake pad and/or brake caliper mounting structure. An illustration of pad kick is provided in FIG. 4. When a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated). At the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifest itself as a moderate-to-severe oscillation of the brake pad in its mount, significantly increasing wear of the abutting brake pad and mount surfaces.

One of ordinary skill in the art will recognize that the brake pad support function may be provided by a brake caliper mount designed to support the brake pads, or by a brake pad carrier which is separate from the caliper mounting structure. For convenience in this description, the terms caliper carrier, caliper mount and brake pad carrier may be interchanged without intending to limit the brake par supporting structure to any specific brake pad and brake caliper carrying structure.

A further advantage of the present invention is that the reduced width in the radially inner region of the brake pad permits brake pad retention features, such as those disclosed in co-pending application Ser. No. 14/640,152, to be moved closer together to enable further reduction in the size of the disc brake components while maintaining a desired level of braking performance and/or or increasing braking performance by increasing brake pad lining surface area while still keeping overall brake size within the space-constrained envelope of the wheel rim and other nearby components.

Other objects, advantages and novel features of the present invention will become apparent from the following detailed description of the invention when considered in conjunction with the accompanying drawings.

DETAILED DESCRIPTION OF THE DRAWINGS

Figure 2:
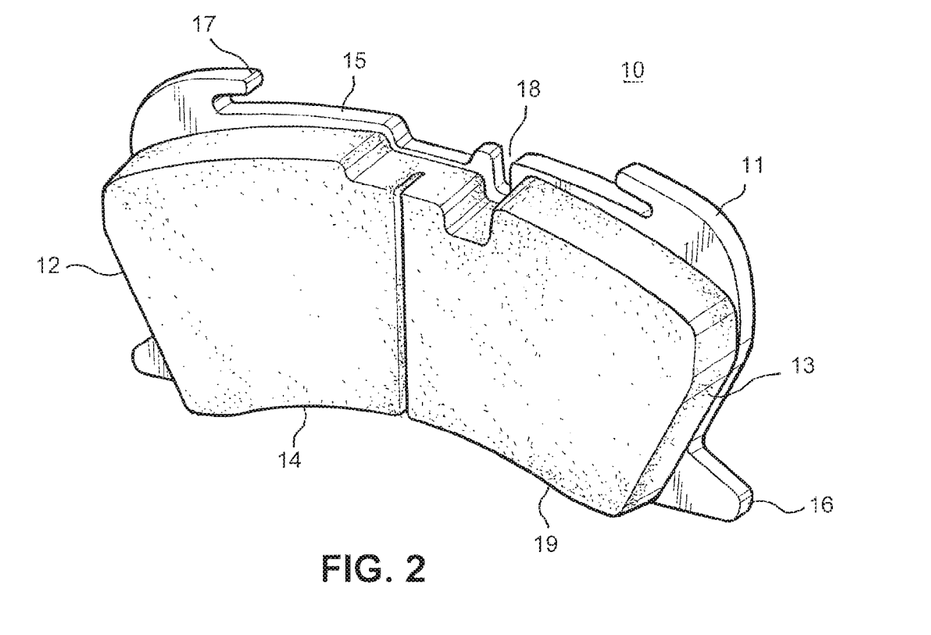
FIG. 2 is an oblique view of a brake pad in accordance with an embodiment of the present invention.
Figure 3:
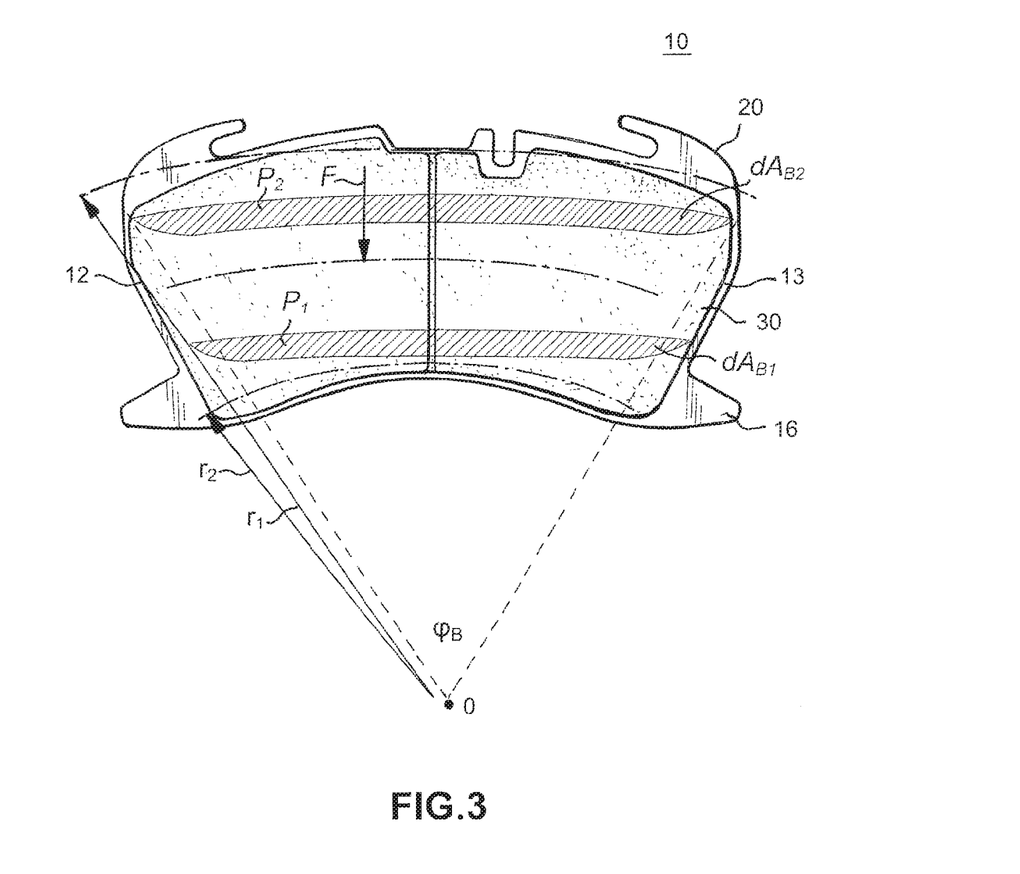
FIG. 3 is an elevation view of the brake pad in FIG. 2.

FIG. 2 is an oblique view of an embodiment of the present invention in which a brake pad 10 includes a backing plate 11 with brake pad friction material 19 affixed thereon. The lateral sides 12, 13 of the brake pad 10 are generally aligned, as shown in FIG. 3, along radii extending from the rotation axis of the brake disc 2 (not illustrated). The radially inner side 14 and the radially outer side 15 of the brake pad 10 are slightly curved, generally following the curvature of the brake disc.

The brake pad backing plate in this embodiment includes lateral projections 16 which are formed to engage corresponding brake pad retention features in the carrier mount 4 in the manner disclosed in co-pending application Ser. No. 14/640,152, such that even in the absence of any additional brake pad retention devices, once engaged in the carrier mount's receiving features the brake pad is positively retained within the disc brake. The backing plate 20 in this embodiment also includes radially outer features, including hook portions 17 suitable for receiving the ends of brake pad vibration suppression and/or reaction devices such as leaf springs (not illustrated), and a notch 18 configured to receive a brake wear sensor (not illustrated). The brake pad backing plate lateral projections, hook portions and wear sensor notch are features of this embodiment, but are not required by the present invention.

The advantages of the present invention's performance in terms of braking energy, brake application pressure and reduced brake pad material wear is illustrated with the aid of FIG. 3 and the following equations.

FIG. 3 is a schematic annotated elevation view of the FIG. 2 embodiment of the inventive brake pad. As shown in this figure, the angle spanned by the arc of the pad material 30, centered on the rotation axis O is of the brake disc $\varphi_B$. The inner and outer radii of the pad material are $r_1$ and $r_2$, respectively. The incremental area used in the integration calculations below over which pressure $P_1$ ($P_2$) is applied is $dA_{B1}$ ($dA_{B2}$).

Using this nomenclature, the energy transfer into brake pad from the brake disc in each incremental area dA is related as:

$$\frac{dE_1}{dA_{B1}} = \frac{dE_2}{dA_{B2}} \quad [1]$$

where $dE_1 = \mu p_1 dA_{B1} r_1 \dot{\varphi} t$ and $dE_2 = \mu p_2 dA_{B2} r_2 \dot{\varphi} t$ The specific energy at any radius r is $$dE(r) = \mu r \dot{\varphi} t \frac{1}{\varphi_B} \int_{-\varphi_B/2}^{\varphi_B/2} p(r, \varphi) r d\varphi dr \quad [2]$$

The incremental area is:

$$dA_S(r) = 2\pi r dr \quad [3]$$

and therefore the specific energy transfer is $$\frac{dE(r)}{dA_S(r)} = \frac{2\mu}{\mu \dot{\varphi} t} \frac{r}{\varphi_B} \int_{-\varphi_B/2}^{\varphi_B/2} p(r, \varphi) r d\varphi = K \quad [4]$$

where K is a constant.

It is known that the brake pad material wear rate and pressure applied between the brake disc and the pad material have a 1:1 relationship:

$$\Delta h = KPvt \quad [5]$$

where h is the pad wear, P is the applied pressure, k is the wear coefficient (material dependent) and v is velocity. Pressure and wear therefore have a direct relationship.

The pressure distribution function (and therefore the pad material wear) may be obtained from the specific energy transfer equation:

$$\hat{p} = \frac{2\pi}{\mu \dot{\varphi} t} \frac{dE(r)}{dA_S(r)} = \frac{1}{\varphi_B} \int_{-\varphi_B/2}^{\varphi_B/2} p(r, \varphi) r d\varphi = K \quad [6]$$

This relationship permits assessment of the relative change in wear performance between two brake pad shapes. Holding other variables constant, the pressure (and wear) ratio between two pad shapes is:

$$\frac{P_1}{P_2} = \frac{\varphi_{B2}}{\varphi_{B1}} \frac{\int_{-\varphi_B/2}^{\varphi_B/2} p(r_1, \varphi) r d\varphi}{\int_{-\varphi_B/2}^{\varphi_B/2} p(r_2, \varphi) r d\varphi} \quad [7]$$

In the case of a brake pad in accordance with the present invention, as compared to a generally rectangular brake pad with the same inner radial height and outer radial height, when both brake pads are being applied to generate the same amount of braking force, the inventive brake pad's greater arc length at the radially outer region of the brake pad results in generation of greater braking force at a lower local pressure as compared to a generally rectangular brake pad, while simultaneously decreasing the amount of braking force needed from the pad material at the radially inner region of the brake pad.

For example, in one comparison of an existing generally rectangular brake pad to the inventive brake pad shape, the inventive brake pad had a 20 cm greater arc length in the radially outer region of the brake disc (the arc angle $\varphi_B$ was approximately five degrees, as determined by the radius of the brake disc and the original arc length of the existing rectangular brake pad. Despite a 4% reduction in the overall brake pad surface area for the inventive "wedge" shaped brake pad, the re-distribution of brake application pressure and braking force resulting from the alteration of the distribution of the pad material along the radial height of the brake pad resulted in a reduction of the P1/P2 brake application pressure ratio reduction, while still obtaining the same braking force, of 1.31:1. In other words, despite the decrease in brake pad material area, with the inventive brake pad arrangements the wear rate was 31% lower than the existing generally rectangular brake pad.

Figure 5:
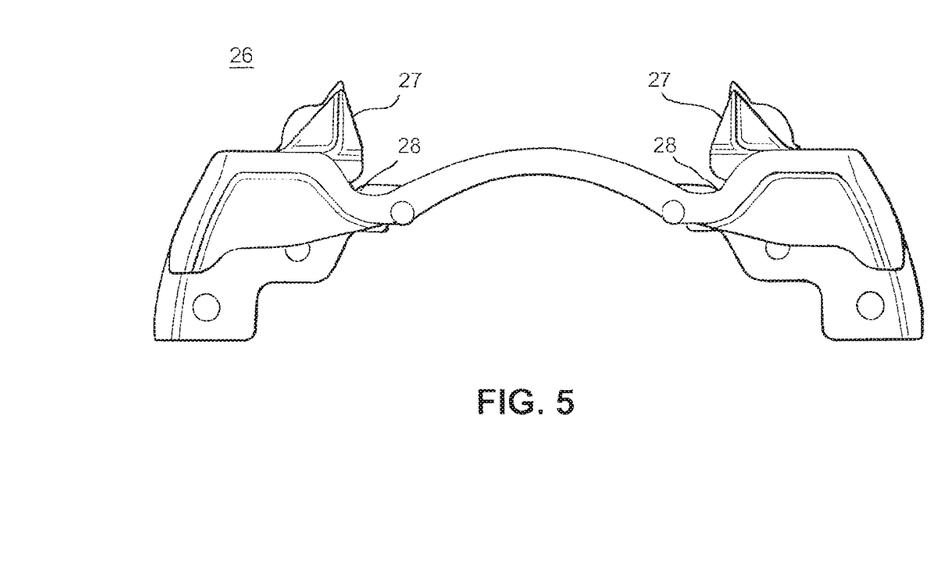
FIG. 5 is an elevation view of an embodiment of a carrier mount configured to complement the brake pad of FIG. 2.

FIG. 5 is an elevation view of a preferred carrier mount 26 configured to complement the brake pad of FIG. 2, having carrier mount brake pad abutment surfaces 27 configured to support the brake pad 10 in the circumferential direction in response to braking reaction forces generated between the brake disc and the brake pads. This is a preferred embodiment, however it is not necessary to change the carrier to obtain many of the benefits of the present invention. As a result of the lateral sides 12, 13 of the brake pad 10 (and hence the pad abutments surfaces 27) being generally aligned along radii extending from the brake disc rotation axis, the transfer of braking forces between the trailing edge of the brake pad 10 and the carrier mount 26 occurs substantially parallel to the tangential direction of the brake disc rotation (i.e., across a surface that is perpendicular to the rotation direction), thereby minimizing forces tending to shift the trailing edge of brake pad radially outward relative to its adjacent carrier mount abutment surface 27. FIG. 5 also shows this carrier mount embodiment's brake pad lateral projection receiving features 28, complementarily shaped to receive brake pad 10's lateral projections 16 to positively retain the brake pad within the disc brake.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 disc brake
2 brake disc
3 brake caliper
4 carrier mount
5 caliper actuator mounting face
6 brake pads
10 brake pad
11 brake pad backing plate
12, 13 brake pad lateral sides
14 brake pad radially inner side
15 brake pad radially outer side
16 backing plate lateral projections
17 radially outer retaining hooks
18 radially outer pad wear sensor notch
19 brake pad friction material
20 brake pad
22, 23 brake pad lateral sides
24 brake pad radially inner side
25 brake pad radially outer side
26 carrier mount
27 carrier mount brake pad abutment surfaces
28 carrier mount brake pad lateral projection receiving features
101 brake pad
102 brake pad leading edge
103 brake pad trailing edge

What is claimed is:

1. A disc brake, comprising:
a brake caliper;
a brake pad including a brake pad backing plate and a brake pad friction material affixed to the backing plate, and
a carrier mount having brake pad abutment surfaces configured to receive the brake pad,
wherein
the brake pad includes non-parallel lateral sides generally aligned along radii extending from a rotation axis of the brake disc,
the carrier mount brake pad abutment surfaces are configured with a shape that complements a shape of the brake pad lateral sides,
the brake pad friction material has a radial height and arc lengths in a circumferential direction of the brake disc that are larger at a radially outer side of the friction material than at a radially inner side of the friction material,
the brake pad friction material has a friction surface area less than or equal to a friction surface area of a friction material of a brake pad having parallel lateral sides, the same radial height, and a circumferential arc length that is between the arc lengths at the radially outer and radially inner sides of the non-parallel side brake pad friction material, and
at a same rate of energy absorption during a braking event, a brake application pressure applied to the non-parallel side brake pad friction material is lower than a brake application pressure of the parallel side brake pad friction material.

2. The disc brake according to claim 1, wherein lateral sides of the brake pad backing plate and lateral sides of the brake pad friction material have matching shapes.

3. The disc brake according to claim 2, wherein each of the brake pad backing plate lateral sides is parallel to an adjacent one of the brake pad friction material lateral sides.

4. A brake pad, comprising:
a brake pad backing plate; and
a brake pad friction material affixed to the backing plate, wherein
- the brake pad friction material includes lateral sides generally aligned along radii having a common origin,
- the brake pad friction material has a radial height and arc lengths in a circumferential direction of the brake disc that are larger at a radially outer side of the friction material than at a radially inner side of the friction material,
- the brake pad friction material has a friction surface area less than or equal to a friction surface area of a friction material of a brake pad having parallel lateral sides, the same radial height, and a circumferential arc length that is between the arc lengths at the radially outer and radially inner sides of the non-parallel side brake pad friction material, and at a same rate of energy absorption during a braking event, a brake application pressure applied to the non-parallel side brake pad friction material is lower than a brake application pressure of the parallel side brake pad friction material.

* * * * *